July 13, 1954 G. D. PAXSON 2,683,807

VARIABLE VOLTAGE WAVE FORM GENERATOR

Filed May 6, 1953 2 Sheets-Sheet 1

INVENTOR.
GORDON DONALD PAXSON
BY Roland A. Anderson
ATTORNEY.

July 13, 1954 G. D. PAXSON 2,683,807

VARIABLE VOLTAGE WAVE FORM GENERATOR

Filed May 6, 1953

2 Sheets-Sheet 2

INVENTOR.

GORDON DONALD PAXSON

BY Roland A. Anderson

ATTORNEY.

Patented July 13, 1954

2,683,807

UNITED STATES PATENT OFFICE 2,683,807

VARIABLE VOLTAGE WAVE FORM GENERATOR

Gordon Donald Paxson, El Cerrito, Calif., assignor to the United States of America as represented by the United States Atomic Energy Commission Application May 6, 1953, Serial No. 353,402

2 Claims. (Cl. 250—27)

The present invention relates to an electronic voltage waveform generator and more particularly to a circuit for generating a voltage waveform having a plurality of variable voltage points which may be varied independently without disturbing the value of the voltage at other points of adjustment of the waveform.

In certain applications of the synchrotron principles for the acceleration of charged particles, it is necessary that the frequency of the accelerating voltage vary at a predetermined rate with respect to the rate of increase of the orbit confining magnetic field. To assure such relationship it has been found desirable to control the frequency of the accelerating field by means of a voltage proportional to current variation in the excitation circuit of the magnetic field structure. In a system of the foregoing type the requirements for accuracy are very rigid thereby rendering the desired accuracy difficult to attain because of the nonlinearity of interconnecting elements. To overcome the latter difficulty, the present invention permits the generation of a waveform of voltage which, when added to the voltage proportional to the magnet current, overcomes variations from the required proportionality between the frequency of the acceleration voltage and the magnetic field strength.

It is therefore an object of the present invention to provide a new and improved voltage waveform generator.

Another object of the invention is to provide a voltage waveform generator for developing a waveform having a plurality of variable points, each of which points may be varied without disturbing the value of the other points.

A further object of the invention is to provide a voltage waveform generator having an output configuration comprising a plurality of straight, connected lines, the slopes of which may be varied.

Another object of the invention is to provide a voltage waveform generator responsive to an input signal whereby the input signal is divided into a plurality of intervals so that the output for any of the intervals has a rate of change which is a positive or negative fraction of the input rate of change and the value of which starts at the value with which the preceding interval ended.

A still further object of the invention is to provide a voltage waveform generator responsive to an input signal whereby the input signal is arbitrarily divided into a plurality of intervals and the starting and ending values of the intervals are functions of the input signal only and independent of time.

Figure 1:
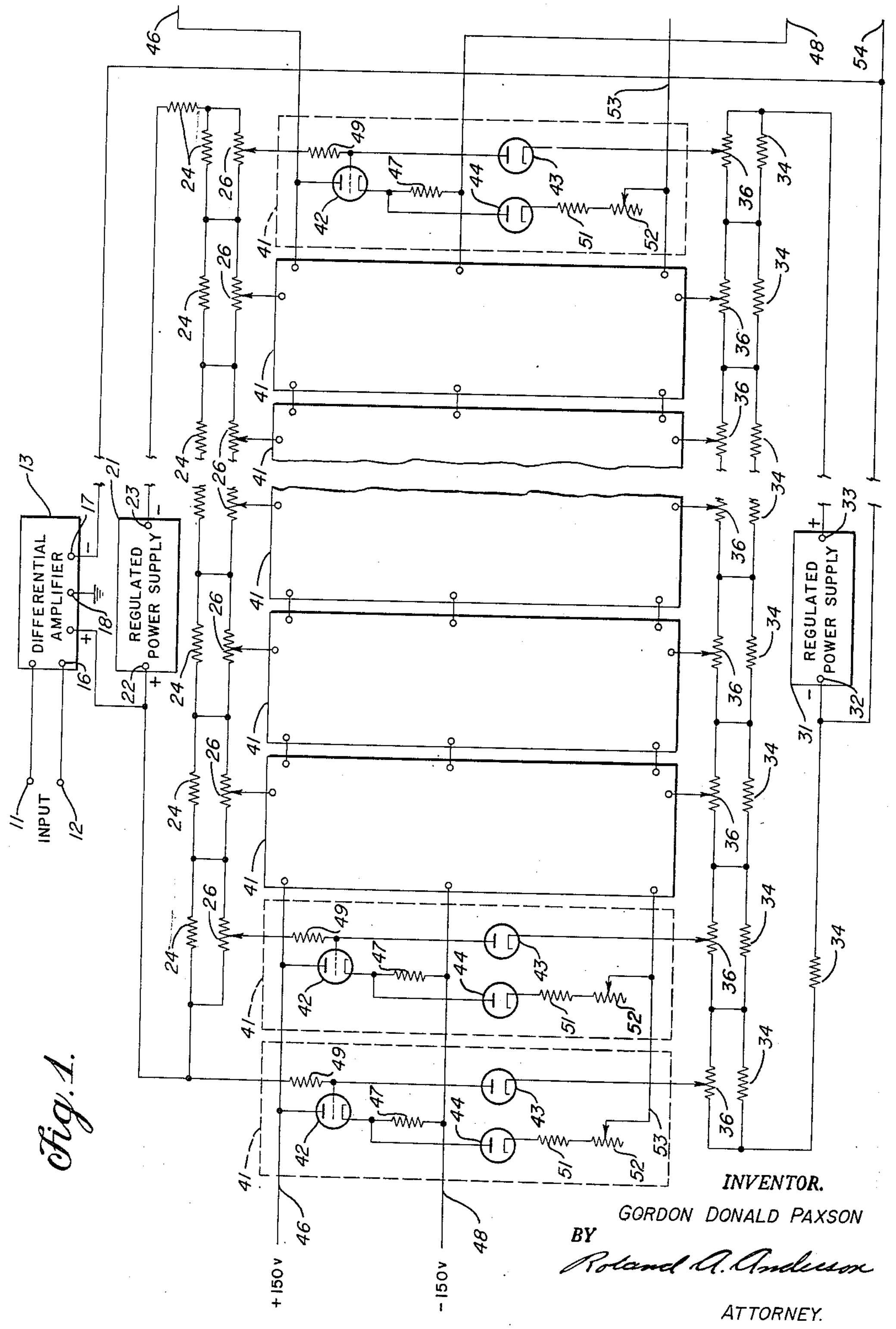
Figure 2:
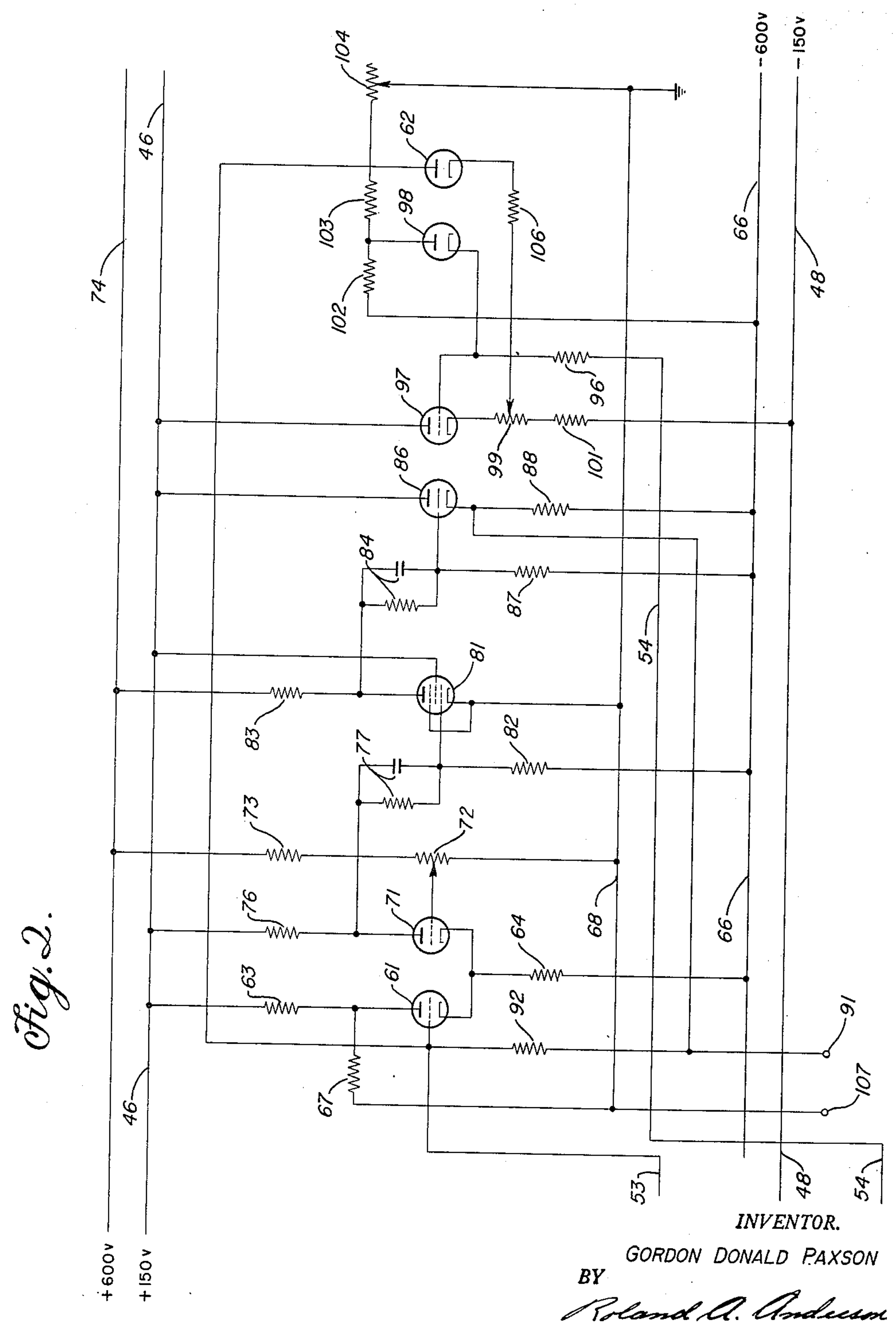

Other objects and advantages of the invention will be apparent in the following description and claims considered together with the accompanying drawing in which:

Figure 1 is a schematic wiring diagram, partially in block form, of a portion of the present invention; and Figure 2 is a schematic wiring diagram of the mixer and output circuit of the invention.

Referring to the drawing in detail, Fig. 1 in particular, there are provided a pair of input terminals 11 and 12, which for the purposes of the present invention may be connected externally of the circuit to a source of sawtooth voltages (not shown). Such input terminals 11 and 12 are also connected to the input of a conventional differential amplifier 13 which provides a pair of output voltages between the terminals 16 and 17 and the grounded terminal 18. The voltage between the terminals 16 and 18 being of opposite phase from that between the terminals 17 and 18. For convenience the polarity of the terminal 16 will be considered as positive with respect to the grounded terminal 18 and the terminal 17 negative with respect to such grounded terminal.

There is also provided a first conventional, regulated power supply 21 having a positive terminal 22 and a negative terminal 23, such polarity being respective. For the purposes of the invention there is no ground connection to the power supply 21 so that the voltage between the two output terminals 22 and 23 is "floating." To develop a plurality of voltage ranges of increasing value a plurality of resistors 24 are series-connected between the two terminals 22 and 23. Except for the end resistors 24, each of the other resistors has a separate potentiometer 26 parallel-connected therewith so that adjustment is possible within each voltage range. A further connection is made from the terminal 22 of the power supply 21 to the terminal 16 of the differential amplifier 13 whereby the "floating" voltage of the former is added to the voltage of the latter.

A second regulated power supply 31, similar to the first power supply 21, is provided having a negative terminal 32 and a positive terminal 33. Again, there is no ground connection with respect to the power supply 31, so that the output voltage thereof is "floating." There is also a voltage divider connected between the terminals 32 and 33 and comprising a plurality of resistors 34 of which all but the one connected to the negative terminal 32 is parallel-connected with a potentiometer 36. A further connection is made from the negative terminal 32 of the power supply 31 to the negative terminal 17 of the amplifier 13 which results in the voltage of the former "floating" on the voltage of the latter.

Interconnected between the above-described two voltage dividers of the power supplies 21 and 31 are a plurality of identical units 41, a few of which are illustrated in detail, some in block form, and some are omitted (see Fig. 1). Each of the units 41 comprises in general a cathode follower tube 42, a first diode tube 43, and a second diode tube 44. The anode of the tube 42 is directly connected to a first bus 46 supplied with a positive potential from a power supply (not shown). Also, a connection is made from the cathode of the tube 42 through a cathode resistor 47 to a second bus 48 supplied with a negative potential from the power supply (not shown). To bias the tube 42 a current limiting resistor 49 is connected between the positive terminal 22 of the power supply 21 and the control grid of the tube while the first diode tube 43 is inserted in the circuit with the anode connected to the control grid and the cathode to the adjustable element of the potentiometer 36 which is closest to the negative terminal of the power supply 31. The anode of the second diode tube 44 is directly connected to the cathode of the tube 42 while the cathode of such diode tube is connected to one end of a series-connected resistor 51 and potentiometer 52. The adjustable element of the potentiometer 52 is connected to a third bus 53 which carries the output of the circuit. The remaining units 41 are similarly connected between successive elements of the two voltage dividers.

From the portion of the circuit described in the foregoing paragraphs, the bus 53 and a lead 54, which is connected to the negative terminal 17 of the differential amplifier 13, are continued and connected to a differential amplifier and mixer circuit (see Fig. 2). The bus 53 is directly connected to the control grid of a triode type vacuum tube 61 and to the anode of a diode type tube 62. The anode of the tube 61 is connected through a dropping resistor 63 to the positive bus 46 and the cathode of such tube is connected through a resistor 64 to a second negative bus 66 of the power supply (not shown). Also, a resistor 67 is connected between the anode of the tube 61 and a grounded bus 68. A second triode type vacuum tube 71 has the cathode thereof directly connected to the cathode of the tube 61 so that voltage changes across the resistor 64 effect the operation of such tube. The control grid of the tube 71 is directly connected to the adjustable element of a potentiometer 72 which is series-connected with a resistor 73 between the grounded bus 68 and a second positive potential bus 74 of the power supply (not shown). The remaining connections to the tube 71 are from the anode through a dropping resistor 76 to the positive bus 46 and to one end of a parallel resistance-capacitance coupling circuit 77. The other end of such coupling circuit 77 is connected to the control grid of a pentode type amplifier tube 81 and to the second negative bus 66 through a resistor 82. The cathode of the tube 81 is directly connected to the grounded bus 68 and to the suppressor grid of the tube. The screen grid is suitably supplied with an operating voltage by a direct connection to the first positive bus 46. Further connections of the tube 81 are from the anode through a dropping resistor 83 to the second positive bus 74 and directly to one end of a parallel resistance-capacitance coupling circuit 84. The other end of the coupling circuit 84 is directly connected to the control grid of a triode type vacuum tube 86 and through a resistor 87 to the second negative bus 66. The anode of the tube 86 is directly connected to the first positive bus 46 while the cathode is connected to the second negative bus 66 through a resistor 88. Such connections of the tube 86 render such tube operative as a cathode follower and the cathode is connected to an output terminal 91 which in turn is connected to the control grid of the input tube 61 through a resistor 92.

The lead 54 is connected through a resistor 96 to the control grid of a triode type tube 97 which is connected to the cathode of a diode type tube 98. The anode of the triode type tube 97 is directly connected to the first positive bus 46 while the cathode is connected through a series-connected potentiometer 99 and resistor 101 to the first negative bus 48. The anode of the diode type tube 98 is connected to the junction of two series-connected resistors 102 and 103 which together with a potentiometer 104 form a voltage divider between the grounded bus 68 and the second negative bus 66. The cathode of the previously-referenced diode type tube 62 is connected through a limiting resistor 106 to the adjustable element of the potentiometer 99. A final connection of the circuit is made directly from the grounded bus 68 to a second output terminal 107 so that the voltages developed across the two output terminals 91 and 107 are output voltages of the circuit.

Consider now the operation of a circuit, as described above, having twenty units 41 so as to provide an output voltage waveform with twenty independently adjustable points. Under such condition the differential amplifier 13 is adapted to amplify an input sawtooth of voltage so that, for example, the voltage between the terminals 16 and 18 is a sawtooth voltage which varies from 0 to +400 volts and that between the terminals 17 and 19 is a sawtooth voltage which simultaneously varies from 0 to −400 volts. With such outputs from the differential amplifier 13, the voltages of the two "floating" power supplies 21 and 31 are set for 400 and 410 volts, respectively. The resistors 24 and 26, and 34 and 36 of the two voltage dividers are of such values that the units 41 operate in a manner to be described hereinafter.

Consider now the operation of the first unit 41 when it is connected between the two voltage dividers; i. e., the unit 41 is connected between the positive terminal 22 of the power supply 21 and the potentiometer 36 is connected closest to the negative terminal 32 of the power supply 31. For the example being described, the adjustable element of the potentiometer 36 is set so that a voltage of +40 volts appears at the cathode of the diode tube 43 and this voltage is with respect to negative terminal 32 of the power supply 31. From the foregoing it will be apparent that, because the control grid of the tube 42 is coupled to the positive terminal 22 of the power supply 21, there will be no effect of the latter upon the operation of the unit 41 being described. Now, as an output sawtooth wave of voltage occurs at the output of the differential amplifier 13 the voltage at the control grid of the tube 42 and the anode of the diode tube 43 increases while the voltage at the cathode of the diode tube 43 decreases. During the first 20 volt change in each of the outputs of the differential amplifier 13 the control grid of the tube 42 becomes increasingly positive so that conduction of the tube increases. At the same time the cathode of the diode tube 43 is more positive than the anode and conduction of such tube prevented. The tube 42 is connected as a cathode follower with suitable operating potentials being supplied and, therefore, the cathode follows the control grid to apply an increasing positive voltage to the anode of the second diode tube 44 and to render the same conductive. Since the tube 42 becomes increasingly conductive as the voltage at the control grid increases, so then does the tube 44 become increasingly conductive as current flows through the resistor 51, potentiometer 52, and bus 53. Such is the operation of the unit 41 during the time each of the outputs of the differential amplifier 13 varies from 0 to 20 volts.

At the time both outputs of the amplifier 13 have a value of 20 volts, it will be readily apparent that the anode and cathode of the diode tube 43 have the same value of impressed voltage. Therefore, as the voltages of the outputs of the amplifier 13 continue to change from 20 to 40 volts, the anode of the diode tube 44 will become more positive than the cathode so that the tube conducts by an increasing amount. Such action results in current flowing through the resistor 49 which opposes the impressed voltage at the control grid of the tube 42. The value of the resistor 49 is such that the tube 42 is not completely cut off until the ouptuts of the differential amplifier 13 reach values of 40 volts. Thus during the time the outputs of the amplifier 13 change from 0 to 40 volts there is developed a voltage across the cathode resistor 47 of the tube 42 which changes from zero to a maximum value and then to zero; i. e., a symmetrical back-to-back sawtooth or triangular wave is developed. The voltage across the cathode resistor 47 in turn controls the conduction of the second diode tube 44 and thereby the flow of current through the bus 53. Thereafter, as the output voltages of the differential amplifier 13 increases from 40 to 400 volts the tube remains in a nonconducting state and the second diode tube 44 is cut off.

The second unit 41 is connected between the adjustable element of the potentiometer 26 connected closest to the positive terminal 22 of the regulated power supply 21 and the adjustable element of the second potentiometer 36 connected at the end of the voltage divider nearest the negative terminal 32 of the power supply 31. The adjustable element of the potentiometer 26 is adjusted to the point where the voltage is —20 volts with respect to the positive terminal 22 of the power supply 21 and similarly the adjustable element of the potentiometer 36 is adjusted to the point where the voltage is +60 volts with respect to the negative terminal 32 of the power supply 31. With potentials established in accordance with the foregoing, it will be apparent that the second unit 41 will operate in the manner set forth for the first unit 41, but within the interval of 20 to 60 volts of the output of the differential amplifier 13.

The following eighteen units 41 are similarly connected between the two voltage dividers with the potentiometers 26 and 36 adjusted to provide voltages successively decreasing in the one instance and successively increasing in the other. Such increase and decrease in voltage in each case being 20 volts so as to provide twenty independently adjustable points with the 400 volts of the output voltage of the differential amplifier 13.

With the adjustable elements of the potentiometers 52 positioned at the center taps thereof, it will be readily apparent that a series of overlapping triangular waves of current will be available at the bus 53. Each of such triangular waves has, in the example being discussed, an equal maximum value and an equal duration. Now, as set forth previously, the first unit 41 operates to draw a current which is linearly increasing to a maximum value during the first 20 volt change of the output of the differential amplifier 13 and linearly decreasing during the second 20 volt change. Also during the second 20 volt change the second unit 41 draws a current which is linearly increasing to a maximum value and during the third 20 volt change draws a current which is linearly decreasing. The following units 41 operate in similar manner so that the current of the bus 53 starts at zero and at the end of the first 20 volt change reaches a maximum value which is maintanied for the remaining period of the input voltage.

The bus 53 is connected to the control grid of the tube 61 and the circuit elements connected to such control grid have values which result in a bias of +10 volts at the maximum values of current during the time each unit 41 is conductive. A further connection to the control grid of the tube 61 comprises the diode tubes 62, triode tube 97, and diode tube 98. The purpose of the latter connection is to supply a negative voltage which varies linearly from zero to —10 volts during the first 20 volt change of the output voltage of the differential amplifier 13 and then remains at —10 volts for the remainder of such output voltage. It is to be noted that the lead 54, which carries the voltage of the negative terminal 17 of the differential amplifier 13, is connected to the control grid of the triode tube 97. The latter tube 97 is suitably furnished operating voltages so that the tube is normally conducting and current flowing through the cathode circuit. The adjustable element of the potentiometer 99 is set so that the diode tube 62 is normally conductive; that is, the cathode is positive with respect to the anode. Now, as the output voltage of the differential amplifier varies linearly from 0 to —20 volts the triode tube becomes decreasingly conductive in a proportional manner which lowers the voltage at the adjustable element of the potentiometer 99, thereby making the diode tube 62 increasingly conductive. The values of the voltages applied and circuit elements connected in the circuit are such that the voltage at the control grid of the triode tube 61, because of the action of the diode tube 62, varies from 0 to —10 volts during the aforesaid change in the output of the differential amplifier 13. The diode tube 98 starts conducting when the control grid of the triode tube 97 is biased at —20 volts and limits such bias voltage to that value. From the foregoing it will be apparent that the voltage of the control grid of the triode tube 61 will be zero for the entire time of the incoming signal.

Having established a condition of zero bias at the control grid of the triode tube 61 for the duration of the incoming voltage, it is necessary to provide a differential output for the purposes of the invention. The amplifier circuit comprising the tubes 61, 71, 81, and 86 is such that 100% of the voltage developed at the cathode of the final tube 86 is fed back to the input. Consider the action of such amplifier when the adjustable element of the potentiometer 52 in the first unit 41 is varied to increase the resistance of the cathode circuit of the diode tube 44. The result of such variation is to decrease the rate of conductance of the tube 44 and the maximum value of current flow when the output voltage of the differential amplifier reaches 20 volts. The bias of the triode tube 61 is altered by the difference between the negative bias supplied from the diode tube 62 and decreased positive bias from the unit 41. The net result is a negative going bias at the control grid of the tube 61, thereby causing a similar voltage to appear across the cathode resistor 64. Since the resistor 64 is also connected to the cathode of the tube 71, the negative going voltage thereacross increases conduction of the tube and thereby decreases the anode voltage. Since the pentode tube 81 is connected to amplify the anode voltage of the tube 71, an increasing voltage is applied to the control grid of the cathode follower tube 86. The cathode voltage of the tube 86 follows the control grid voltage and so a positive going voltage is fed back to the control grid of the triode tube 61 and directly to the output terminal 91. The value of the cathode resistor 88 is selected so that the cathode of the tube 86 swings about zero voltage with respect to ground depending upon the amount of current flowing through the tube.

Applying the same operating principles, it is apparent that, when the adjustable element of the potentiometer 52 is moved to decrease the amount of resistance in the cathode circuit of the diode tube 44, a greater maximum value of current flow is reached at the 20 volt point of the voltage of the differential amplifier 13. Such change increases the grid bias of the tube 61 and results in a negative voltage at the output terminal 91.

Also, it is to be noted that each of the other units 41 may be similarly operated to vary the maximum current drawn by the individual unit and thereby adjusts the voltage waveform at the output terminals 91 and 107 between the range of +10 to −10 volts. As indicated previously, the adjustment of one of the units 41 changes the voltage of the output at the terminals 91 and 107 at the point of maximum conduction without effecting the voltages determined by the other units 41, but the slope of the output voltage between such adjusted point and the preceding, as well as following, points is varied. In such manner then there has been described a voltage waveform generator having great flexibility to accomplish the objects of the invention.

A list of values and types, where applicable, of the various elements of the invention will be set forth hereinafter. Such list will be in accordance with the twenty-point waveform generator as described in detail in the foregoing and should not be construed as limiting in any respect.

24. Resistor 100 ohms
26. Resistor 1000 ohms
34. Resistor 100 ohms
36. Resistor 1000 ohms
42. Tube, type ½ 12AT7
43. Tube, type ½ 6AL5
44. Tube, type ½ 6AL5
47. Resistor 150K ohms
49. Resistor 1 megohm
51. Resistor 10K ohms
52. Resistor 50K ohms
61. Tube, type ½ 12AY7
62. Tube, type ½ 6AL5
63. Resistor 47K ohms 64. Resistor 300K ohms
67. Resistor 1 megohm
71. Tube, type ½ 12AY7
72. Resistor 5K ohms
73. Resistor 600K ohms
76. Resistor 47K ohms
77. Resistor 1.2 megohm and Capacitor 10 micro-microfarad
81. Tube, type 6AU6
82. Resistor 6.2 megohm
83. Resistor 150K ohms
84. Resistor 1.2 megohm and Capacitor 10 micro-microfarad
86. Tube, type ½ 12AU7
87. Resistor 6.2 megohm
88. Resistor 30K ohms
92. Resistor 12K ohms
97. Tube, type ½ 12AU7
98. Tube, type ½ 6AL5
99. Resistor 5K ohms
101. Resistor 75K ohms
102. Resistor 50K ohms
103. Resistor 1200 ohms
104. Resistor 1K ohms
106. Resistor 13K ohms It will be apparent from consideration of the foregoing that the invention is useful for applications other than the one outlined earlier with respect to the frequency control of the accelerating voltage of a particle accelerator. In such respect it is desired to point out that the slope of the incoming signal may be varied to alter the interval between selected adjustable points of the waveform being developed thereby furthering the flexibility of the invention.

While the salient features of the invention have been set forth in detail with respect to one embodiment it will be apparent that numerous modifications may be made within the spirit and scope of the invention, and it is therefore not desired to limit the invention to the exact details shown and described except insofar as they may be defined in the following claims.

What is claimed is:

1. In a circuit for developing a voltage waveform having a plurality of adjustable points in response to an input voltage wave, the combination comprising a differential amplifier developing positive and negative output voltages in response to an input voltage with the polarity being with respect to ground and the waveform of such voltages being substantially the same, a plurality of triode tubes connected as cathode followers, means connected to said triode tubes to supply operating voltages, a plurality of series circuits including a resistor and a diode with the junction therebetween respectively connected to the control grids of said triode tubes, said resistor of one of said series circuits being connected directly to the positive output of said amplifier and the cathode of said diode being connected to the negative terminal of said amplifier through an element having a fixed value of voltage opposing the output voltage of said amplifier, the remainder of said series circuits being successively connected in a similar manner with an element having a value of voltage thereacross which is one-half that of said fixed value inserted in opposition in the connections at either end, a plurality of variable impedances respectively connected at one end to the cathodes of said triode tubes and at the other end to each other, a negative feedback amplifier having a cathode follower output, the input of said negative feedback amplifier being connected to the common connection of said variable impedances, bias means connected to the input of said negative feedback amplifier for canceling the voltage impressed when said variable impedances are set at mid-value, and operating voltages connected to said cathode follower output such that the cathode thereof operates above and below ground potential in accordance with the settings of the individual variable impedances.

2. In a voltage waveform generator, the combination comprising a differential amplifier developing positive and negative output voltages in response to an input voltage with the polarity being with respect to ground and the waveform of such voltages being substantially the same, a first floating power supply having the positive terminal connected to the positive output of said amplifier, a first voltage divider having a plurality of variable voltage points connected across said first power supply, a second floating power supply having the negative terminal connected to the negative output of said amplifier, a second voltage divider having a plurality of variable voltage points connected across said second power supply, a plurality of cathode follower tubes having the anode and cathode circuits connected to a source of operating voltages, a plurality of first diodes having the anodes respectively connected to the control grids of said cathode follower tubes, a plurality of second diodes having the anodes respectively connected to the cathodes of said cathode follower tubes, a plurality of current limiting resistors, one of which is connected between the control grid of the first of said cathode follower tubes and the positive terminal of said first power supply and the remainder of which are respectively connected between the control grids of successive cathode follower tubes and successive variable voltage points of said first voltage divider, the cathode of the first of said first diodes being connected to the first variable point of said second voltage divider closest to the negative terminal of said power supply and the cathodes of the remaining cathode follower tubes being respectively connected to successive variable voltage points of said second power supply, a plurality of variable resistors respectively connected to the cathodes of said second diodes and having the adjustable elements thereof connected together, a negative feedback amplifier having a cathode follower output, the input of said negative feedback amplifier being connected to the common connection of said variable resistors, bias means connected to the input of said negative feedback amplifier for canceling the voltage impressed when said variable resistors are set at mid-value, and operating voltages connected to said cathode follower output such that the cathode thereof operates above and below ground potential in accordance with the settings of each of said variable resistors.

References Cited in the file of this patent

UNITED STATES PATENTS

| Number | Name | Date |
|---|---|---|
| 2,409,229 | Smith, Jr., et al. | Oct. 15, 1946 |
| 2,486,391 | Cunningham | Nov. 1, 1949 |
| 2,488,297 | Lacy | Nov. 15, 1949 |
| 2,529,666 | Sands | Nov. 14, 1950 |
| 2,541,039 | Cole | Feb. 13, 1951 |